US012511476B2

(12) United States Patent
Chen et al.

(10) Patent No.: US 12,511,476 B2
(45) Date of Patent: Dec. 30, 2025

(54) CONCEPT-CONDITIONED AND PRETRAINED LANGUAGE MODELS BASED ON TIME SERIES TO FREE-FORM TEXT DESCRIPTION GENERATION

(71) Applicant: NEC Laboratories America, Inc., Princeton, NJ (US)

(72) Inventors: Yuncong Chen, Plainsboro, NJ (US); Yanchi Liu, Monmouth Junction, NJ (US); Wenchao Yu, Plainsboro, NJ (US); Haifeng Chen, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 244 days.

(21) Appl. No.: 18/359,113

(22) Filed: Jul. 26, 2023

(65) Prior Publication Data

US 2024/0061998 A1    Feb. 22, 2024

Related U.S. Application Data

(60) Provisional application No. 63/402,202, filed on Aug. 30, 2022, provisional application No. 63/399,718, filed on Aug. 21, 2022.

(51) Int. Cl.
*G06F 40/242* (2020.01)
*G06F 40/205* (2020.01)
(Continued)

(52) U.S. Cl.
CPC .......... *G06F 40/242* (2020.01); *G06F 40/205* (2020.01); *G06F 40/284* (2020.01); *G06F 40/56* (2020.01)

(58) Field of Classification Search
CPC .... G06F 40/242; G06F 40/284; G06F 40/205; G06F 40/30; G06F 40/35; G06F 40/56
(Continued)

(56) References Cited

U.S. PATENT DOCUMENTS 12,045,568 B1 *   7/2024   Shrivastava  ........ G10L 15/1815
12,271,698 B1 *   4/2025   Wang  ................ G06F 16/24522
(Continued)

OTHER PUBLICATIONS

Van Aken, Betty, et al. "How does bert answer questions? a layer-wise analysis of transformer representations." Proceedings of the 28th ACM international conference on information and knowledge management. 2019, pp. 1823-1832. (Year: 2019).*

(Continued)

*Primary Examiner* — James S Wozniak
(74) *Attorney, Agent, or Firm* — Joseph Kolodka; Vincent Duffy

(57) ABSTRACT

A computer-implemented method for employing a time-series-to-text generation model to generate accurate description texts is provided. The method includes passing time series data through a time series encoder and a multilayer perceptron (MLP) classifier to obtain predicted concept labels, converting the predicted concept labels, by a serializer, to a text token sequence by concatenating an aspect term and an option term of every aspect, inputting the text token sequence into a pretrained language model including a bidirectional encoder and an autoregressive decoder, and using adapter layers to fine-tune the pretrained language model to generate description texts.

20 Claims, 8 Drawing Sheets

(51) Int. Cl.
*G06F 40/284* (2020.01)
*G06F 40/56* (2020.01)

(58) Field of Classification Search
USPC .................................................. 704/9, 10
See application file for complete search history.

(56) References Cited

U.S. PATENT DOCUMENTS

| | | | | |
|---|---|---|---|---|
| 2009/0240729 | A1* | 9/2009 | Zwol | G06F 16/285 |
| | | | | 707/E17.046 |
| 2018/0300400 | A1* | 10/2018 | Paulus | G06N 3/044 |
| 2020/0265060 | A1* | 8/2020 | Crapo | G06N 3/044 |
| 2021/0012179 | A1* | 1/2021 | Kalia | G06F 40/284 |
| 2022/0382975 | A1* | 12/2022 | Gu | G06F 40/216 |
| 2022/0391755 | A1* | 12/2022 | Li | G06N 3/045 |
| 2022/0414344 | A1* | 12/2022 | Makki Niri | G06F 40/30 |
| 2023/0135659 | A1* | 5/2023 | Wu | G06N 3/044 |
| | | | | 706/21 |
| 2023/0342559 | A1* | 10/2023 | Bhardwaj | G06N 20/00 |
| 2024/0045890 | A1* | 2/2024 | Nguyen | G06Q 40/02 |
| 2024/0386015 | A1* | 11/2024 | Crabtree | G06F 16/9024 |
| 2024/0412008 | A1* | 12/2024 | Salim | G06N 3/0442 |

OTHER PUBLICATIONS

Cho, Jaemin, et al. "Unifying vision-and-language tasks via text generation." International Conference on Machine Learning. PMLR, 2021, pp. 1-12. (Year: 2021).*

Ding, Ning, et al. "Delta tuning: A comprehensive study of parameter efficient methods for pre-trained language models." arXiv preprint arXiv:2203.06904. Mar. 2022, pp. 1-49. (Year: 2022).*

Zhang, Zhengkun, et al. "Hyperpelt: Unified parameter-efficient language model tuning for both language and vision-and-language tasks." arXiv preprint arXiv:2203.03878. Mar. 2022, pp. 1-14. (Year: 2022).*

Jin, Xisen, et al. "Learn continually, generalize rapidly: Lifelong knowledge accumulation for few-shot learning." arXiv preprint arXiv: 2104.08808. Aug. 2022, pp. 1-16. (Year: 2022).*

Li, Jingye, et al. "Unified named entity recognition as word-word relation classification." proceedings of the AAAI conference on artificial intelligence. vol. 36. No. 10. Jun. 2022, pp. 10965-10973. (Year: 2022).*

Osei-Brefo, Emmanuel, et al. "UoR-NCL at SemEval-2022 Task 6: Using ensemble loss with BERT for intended sarcasm detection." Proceedings of the 16th International Workshop on Semantic Evaluation (SemEval—2022). Jul. 2022, pp. 871-876. (Year: 2022).*

Ustun, Ahmet, et al. "UDapter: Language adaptation for truly Universal Dependency parsing." arXiv preprint arXiv:2004.14327. Oct. 2020, pp. 1-14. (Year: 2020).*

Yan, Hang, et al. "A unified generative framework for various NER subtasks." arXiv preprint arXiv:2106.01223. Jun. 2021, pp. 1-15. (Year: 2021).*

Goyal, et al. "Professor forcing: A new algorithm for training recurrent networks." Advances in neural information processing systems 29, 2016, pp. 1-9. (Year: 2016).*

Wang, Xinyi, et al. "Efficient test time adapter ensembling for low-resource language varieties." arXiv preprint arXiv:2109.04877. Sep. 2021, pp. 1-8. (Year: 2021).*

Qin, Y., Song, D., Chen, H., Cheng, W., Jiang, G., & Cottrell, G. (Aug. 14, 2017). A dual-stage attention-based recurrent neural network for time series prediction. arXiv preprint arXiv:1704.02971.

Holtzman, A., Buys, J., Du, L., Forbes, M., & Choi, Y. (Apr. 22, 2019). The curious case of neural text degeneration. arXiv preprint arXiv:1904.09751.

Lewis, M., Liu, Y., Goyal, N., Ghazvininejad, M., Mohamed, A., Levy, O., . . . & Zettlemoyer, L. (Oct. 29, 2019). Bart: Denoising sequence-to-sequence pre-training for natural language generation, translation, and comprehension. arXiv preprint arXiv:1910.13461.

He, J., Zhou, C., Ma, X., Berg-Kirkpatrick, T., & Neubig, G. (Oct. 8, 2021). Towards a unified view of parameter-efficient transfer learning. arXiv preprint arXiv:2110.04366.

Bengio, S., Vinyals, O., Jaitly, N., & Shazeer, N. (Dec. 11, 2015). Scheduled sampling for sequence prediction with recurrent neural networks. Advances in neural information processing systems, 28.

* cited by examiner

CONCEPT-CONDITIONED AND PRETRAINED LANGUAGE MODELS BASED ON TIME SERIES TO FREE-FORM TEXT DESCRIPTION GENERATION

RELATED APPLICATION INFORMATION

This application claims priority to Provisional Application No. 63/399,718 filed on Aug. 21, 2022, and Provisional Application No. 63/402,202 filed on Aug. 30, 2022, the contents of both of which are incorporated herein by reference in their entirety.

BACKGROUND

Technical Field

The present invention relates to time series data, and, more particularly, to concept-conditioned and pretrained language models based on time series to free-form text description generation.

Description of the Related Art

Time series have a central importance in many application domains including industrial monitoring, human activity analysis, and medical data analysis. Time series are usually complex and difficult to interpret without explanation by human domain experts. Training experts who can explain time series data takes time and experienced experts are costly to attain. The increase in volume and speed of the generation of new data across industries poses an even higher demand for experts. Efforts have been made to automate the time series analysis task to reduce the reliance on human experts. Modern time series analytics software train machine learning models to perform pattern detection and classification. A limitation of such software is that such software only provides simple labels (e.g., an anomaly detection software gives binary labels of "normal" or "abnormal"). In contrast, descriptions given by human experts are free-form texts, which are both more detailed (mentioning multiple aspects) and more engaging (natural language are more easily understandable by non-expert users).

SUMMARY

A method for employing a time-series-to-text generation model to generate accurate description texts is presented. The method includes passing time series data through a time series encoder and a multilayer perceptron (MLP) classifier to obtain predicted concept labels, converting the predicted concept labels, by a serializer, to a text token sequence by concatenating an aspect term and an option term of every aspect, inputting the text token sequence into a pretrained language model including a bidirectional encoder and an autoregressive decoder, and using adapter layers to fine-tune the pretrained language model to generate description texts.

A non-transitory computer-readable storage medium comprising a computer-readable program for employing a time-series-to-text generation model to generate accurate description texts is presented. The computer-readable program when executed on a computer causes the computer to perform the steps of passing time series data through a time series encoder and a multilayer perceptron (MLP) classifier to obtain predicted concept labels, converting the predicted concept labels, by a serializer, to a text token sequence by concatenating an aspect term and an option term of every aspect, inputting the text token sequence into a pretrained language model including a bidirectional encoder and an autoregressive decoder, and using adapter layers to fine-tune the pretrained language model to generate description texts.

A system for employing a time-series-to-text generation model to generate accurate description texts is presented. The system includes a processor and a memory that stores a computer program, which, when executed by the processor, causes the processor to pass time series data through a time series encoder and a multilayer perceptron (MLP) classifier to obtain predicted concept labels, convert the predicted concept labels, by a serializer, to a text token sequence by concatenating an aspect term and an option term of every aspect, input the text token sequence into a pretrained language model including a bidirectional encoder and an autoregressive decoder, and use adapter layers to fine-tune the pretrained language model to generate description texts.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

An automated method is needed, that given a time series, generates accurate and fluent free-form text descriptions instead of simple labels. Such method can ease the adoption of time series analytics by average users and enable a human-centric artificial intelligence (AI) interface.

The data to enable the development of a machine language (ML)-based description generation model are readily available in many scenarios. A user can often acquire large amounts of time series data tagged with human comments. For example, given a yoga demonstration video with narration by the coach, a user can detect the keypoints of the body as he/she performs a specific maneuver using computer vision models, and then the coordinates of the keypoints over time constitute a multivariate time series. The transcribed narration texts can be used as annotation of different windows of the time series.

Using such time-series/text pairs, the relation between these two modalities can be learned to create an AI model that functions as a virtual expert to generates free-form description texts based on an input time-series window. As best understood, there are no existing systems that can perform this task, nor does any existing system utilize time-series/text pairs to achieve such goal.

Figure 1:
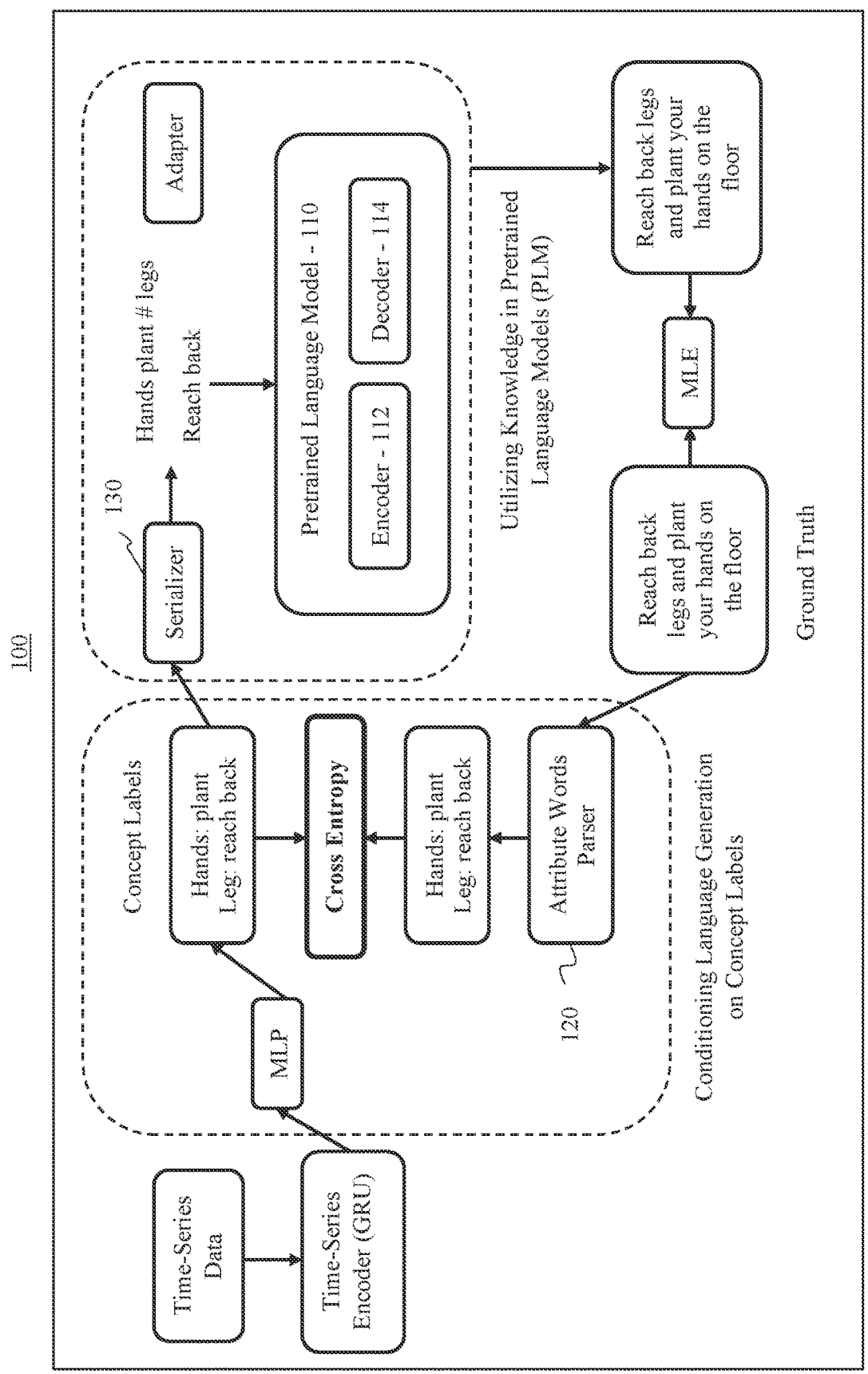
FIG. 1 is a block/flow diagram of an architecture of the exemplary time-series-to-text model, in accordance with embodiments of the present invention.

The exemplary embodiments of the present invention propose a time-series-to-text generation model, that given a time series window, generates accurate and fluent description texts. FIG. 1 shows the architecture of the model. Compared to previous works, the exemplary model presents at least two main innovations. The first innovation is using the prediction of concepts as an auxiliary task to encourage the extraction of only the relevant information from the time series data. This improves the accuracy of key aspects in the generated description. The second innovation is to use adapters to efficiently finetune pretrained language models (PLM) for text generation conditioned on predicted concepts. This leverages the linguistic knowledge embedded in large pretrained langue models to reduce the need for domain training data.

In one example, a dataset of n pairs of a time series segment is acquired and free-form description text is further obtained. The i'th pair is denoted by $(x^{(i)}, y^{(i)})$, where $x^{(i)}$ is the time series segment and $y^{(i)}$ is the text. The time series can include more than one variable, i.e., multivariate. Each time series is normalized based on the minimum and maximum values in the entire training dataset, so that their values after normalization range between 0 and 1. Every text in the training set is tokenized into a token sequence using the tokenizer associated with the pretrained language model 110. Each text is then passed to the concept word parser 120 and the results are aggregated to build a domain concept dictionary.

Referring to FIG. 1, the model includes a time series encoder, a time series classifier, a concept serializer and a pretrained language model with adapter layers.

The time series encoder can be implemented as a recurrent neural network (RNN), a transformer or any sequence model. One possible implementation is a dual-attention RNN for multivariate input series. A dual-attention RNN takes the input time series and at each timestep outputs a hidden state vector that represents the information up to that time step.

The classifier is a multi-layer perceptron (MLP). The MLP classifier takes the last hidden vector of the time series encoder and predicts concept labels based on the domain concept dictionary.

The serializer 130 converts predicted concept labels into a text token sequence by concatenating the aspect term and the option term of every aspect. Different aspects are separated by a comma. For example, the concept label {hands: reach up; right leg: pull back} is converted to "hands reach up, right leg pull back."

Figure 5:
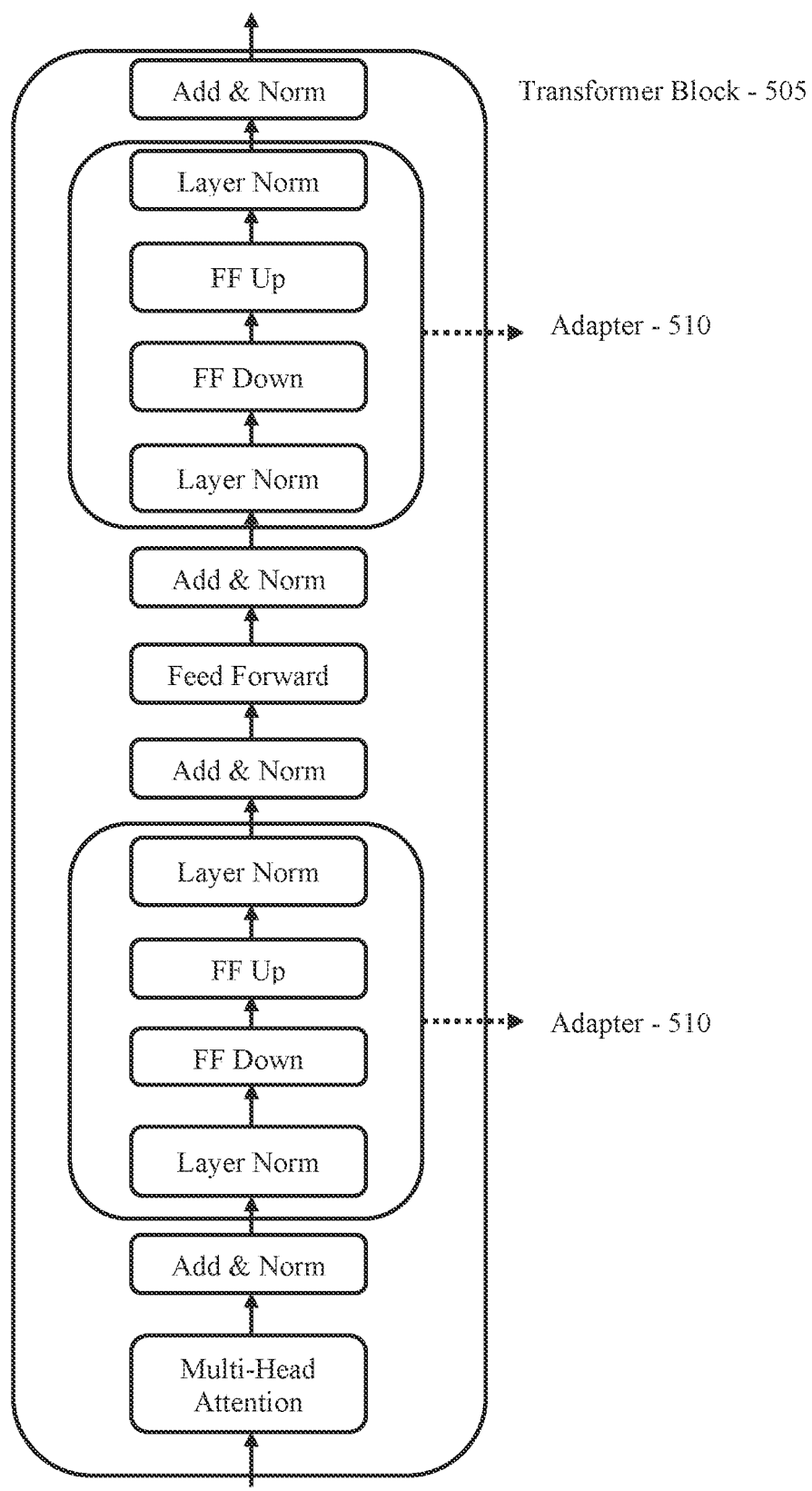
FIG. 5 is a block/flow diagram of an exemplary BART architecture for placement of adapter layers in the transformer layers of the BART language model, in accordance with embodiments of the present invention.

The language model 110 is used to generate texts conditioned on the serialized concept token sequence. The language model 110 is a modified version of a pretrained language model (PLM) such as BART. The language model includes an encoder 112 and a decoder 114. Both are a stack of pretrained transformer layers. The exemplary methods modify BART by inserting adapter layers 510 in all the transformer layers, as illustrated in FIG. 5. The adapter 510 includes several layers, each with a down-projection and an up-projection.

The input to the BART encoder 112 is the serialized concept token sequence. The input to the decoder 114 is the token sequence of either the complete ground-truth text (when in the training stage) or the partial text generated up to a particular position (when in the autoregressive generation/testing stage). At each position, the embedding of the input token is looked up and passed forward to the self-attention layer. The causal self-attention layer transforms the embedding vector using a dynamically selected set of hidden states that are before the current position. The cross-attention layer further applies a transformation using a dynamically selected set of time series encoder hidden states. A subsequent projection layer generates a probability distribution over all tokens in the vocabulary. According to this distribution, a text token is sampled as the output at the current position.

Regarding training, the model 110 is trained end-to-end using stochastic gradient descent (SGD). All parameters of PLM except those of the adapter layers are frozen (not updated in SGD). At each training iteration, a batch of paired data is sampled. The total concept prediction cross-entropy loss and text token maximum likelihood estimation (MLE) loss are computed. SGD updates the parameters (that are not frozen) in iterations to minimize the sum of these two losses.

Regarding computing the concept prediction loss, for each sample, the exemplary methods sum the cross entropy between the predicted concept label and the true label for every aspect. They are then aggregated over the batch.

Regarding computing the text MLE loss, for each sample, the cross entropy between the language model's probability distribution and the ground-truth token at every position is computed. They are then aggregated over the batch.

The exemplary methods adopt the scheduled sampling when finetuning the language model. Scheduled sampling uses a mixture or combination of teacher-forcing and free-running modes in training. After the language model outputs each token, the exemplary methods randomly choose one of these two modes to determine the input at the next position. In the teacher forcing mode, the input at the next position is the true token at that position in the training text. In the auto-regressive free-running mode, a token is sampled from the vocabulary according to the output distribution of the current position and used as the input at the next position.

Figure 4:
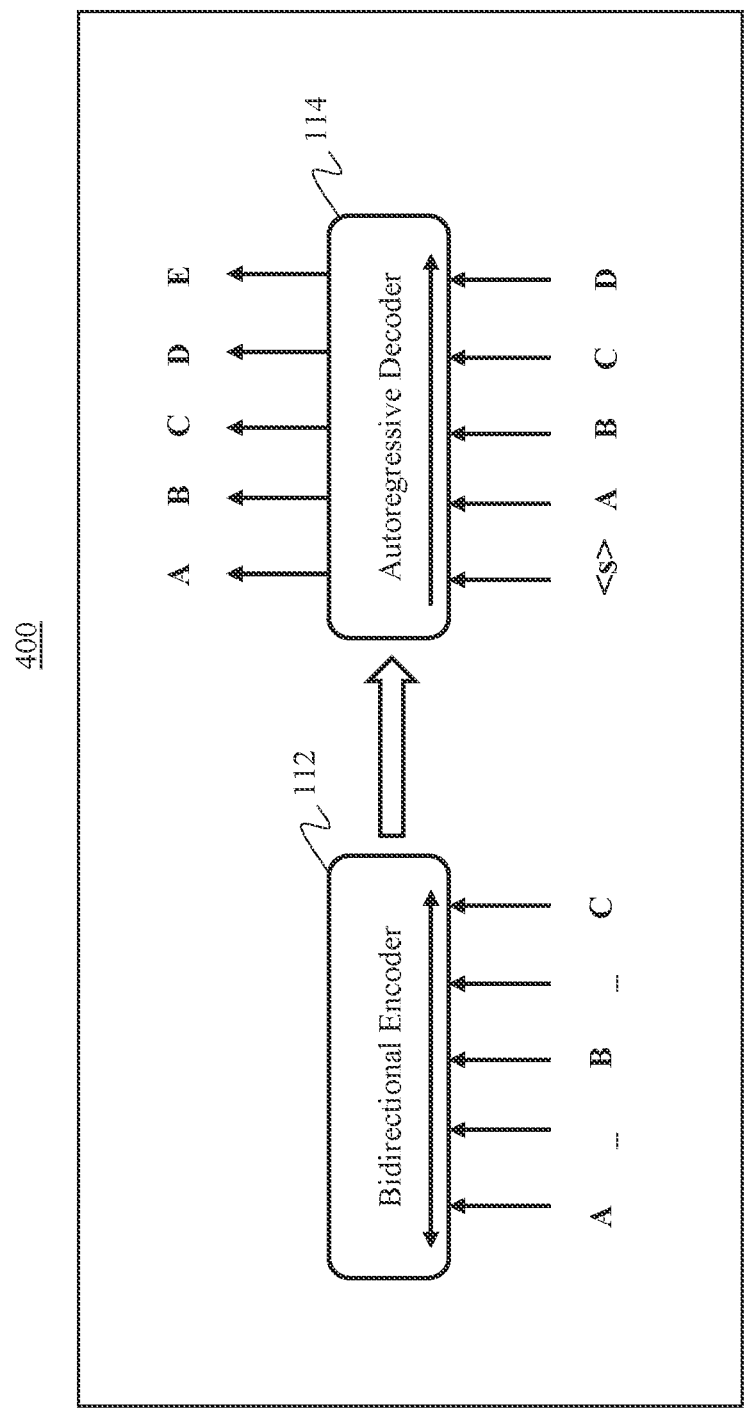
FIG. 4 is a block/flow diagram of an exemplary bidirectional encoder and autoregressive decoder of the pretrained language model, in accordance with embodiments of the present invention.

Regarding testing, at test time, a time series segment that needs a description is passed through the neural network. The serialized concept token sequence is obtained and used as input to the BART encoder 112. The initial input to the decoder 114 is the start-of-text symbol <s>, as shown in FIG. 4. The free-running mode is used, e.g., the sampled output token at each position is used as the input for the next position. This autoregressive decoding process repeats until a </s> symbol is generated. The generated token sequence is joined to form a text string that will be returned to the user. Repeated sampling can generate a set of output texts. To increase the diversity of language usage among the generated texts, top-p sampling (nucleus sampling) is used.

Figure 2:
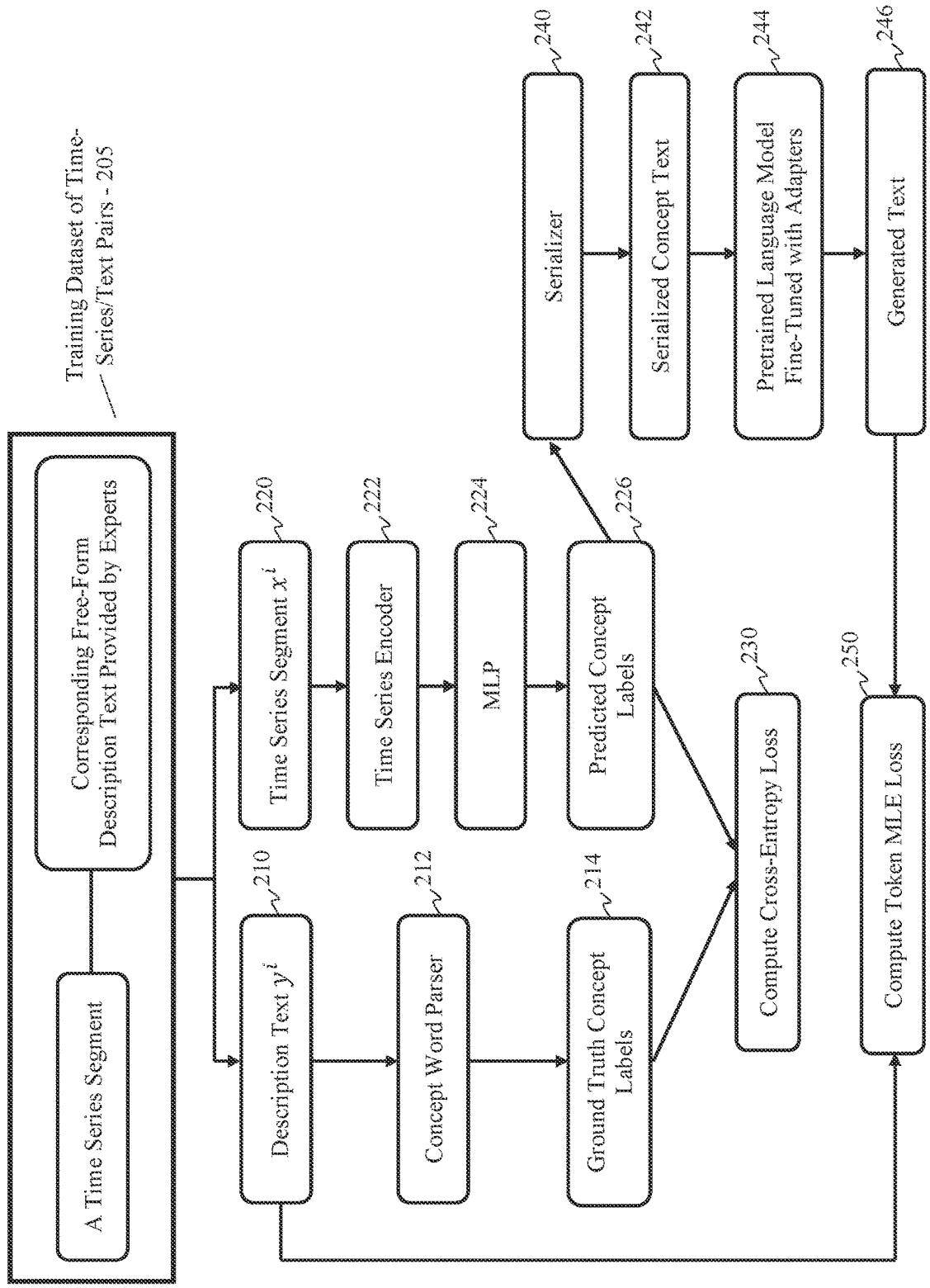
FIG. 2 is a block/flow diagram of an exemplary training procedure, in accordance with embodiments of the present invention.

FIG. 2 is a block/flow diagram of an exemplary training procedure, in accordance with embodiments of the present invention.

The training dataset of time series and text pairs 205 includes a time series segment and corresponding free-form description text provided by experts.

The training includes, e.g.:

At block 210, description text $y^i$ is extracted.

At block 212, a constituency parsing-based "concept word" parser is used to mine phrases related to key aspects from training texts.

At block 214, the concepts serve as ground truth for training concept classifiers.

At block 220, time series segments $x^i$ are extracted.

At block 222, the time series encoder is implemented. The time series encoder takes the input time series and at each timestep outputs a hidden state vector that represents the information up to that time step.

At block 224, the classifier employed is a multi-layer perceptron (MLP). The MLP classifier takes the last hidden vector of the time series encoder and predicts concept labels based on the domain concept dictionary.

At block 226, predicted concept labels are generated.

At block 230, the cross-entropy loss is computed.

At block 240, the serializer converts predicted concept labels into a text token sequence by concatenating the aspect term and the option term of every aspect. Different aspects are separated by a comma.

At block 242, a serialized concept token sequence is obtained.

At block 244, the pretrained language model is fine-tuned with adapters.

At block 246, the output text is generated.

At block 250, the token MLE loss is computed.

Therefore, in the training phase, time series/text pairs are used to compute concept label cross-entropy loss and text token MLE loss. Losses are then optimized with stochastic gradient descent (SGD).

Figure 3:
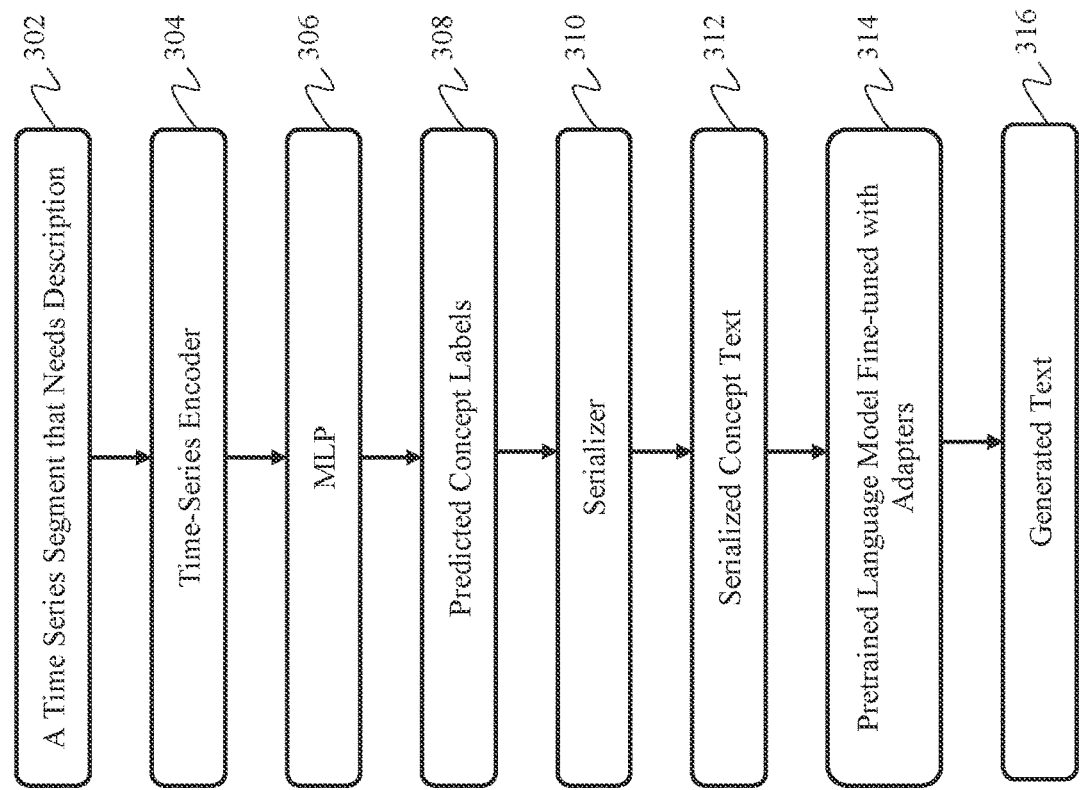
FIG. 3 is a block/flow diagram of an exemplary testing procedure, in accordance with embodiments of the present invention.

FIG. 3 is a block/flow diagram of an exemplary testing procedure, in accordance with embodiments of the present invention.

At block 302, a time series segment needs a description.

At block 304, a serialized concept token sequence is obtained and used as input to the encoder. The encoder can be, for example, a BART encoder.

At block 306, a multilayer perceptron (MLP) classifier is employed.

At block 308, predicted concept labels are generated.

At block 310, a serializer is employed.

At block 312, serialized concept text is generated.

At block 314, the pretrained language model is fine-tuned with adapters.

At block 316, the output text is generated.

Therefore, in the testing phase, the input is a time series segment that needs a description, and the output is the generated description text.

FIG. 4 is a block/flow diagram 400 of an exemplary bidirectional encoder 112 and autoregressive decoder 114, in accordance with embodiments of the present invention.

The bidirectional encoder 112 and autoregressive decoder 114 are part of the pretrained language model 110.

FIG. 5 is a block/flow diagram of an exemplary BART architecture for placement of adapter layers in the transformer layers of the BART language model, in accordance with embodiments of the present invention.

The transformer block 505 is modified to include adapter layers 510. The adapter layers 510 include several layers, each with a down projection and an up projection.

Figure 6:
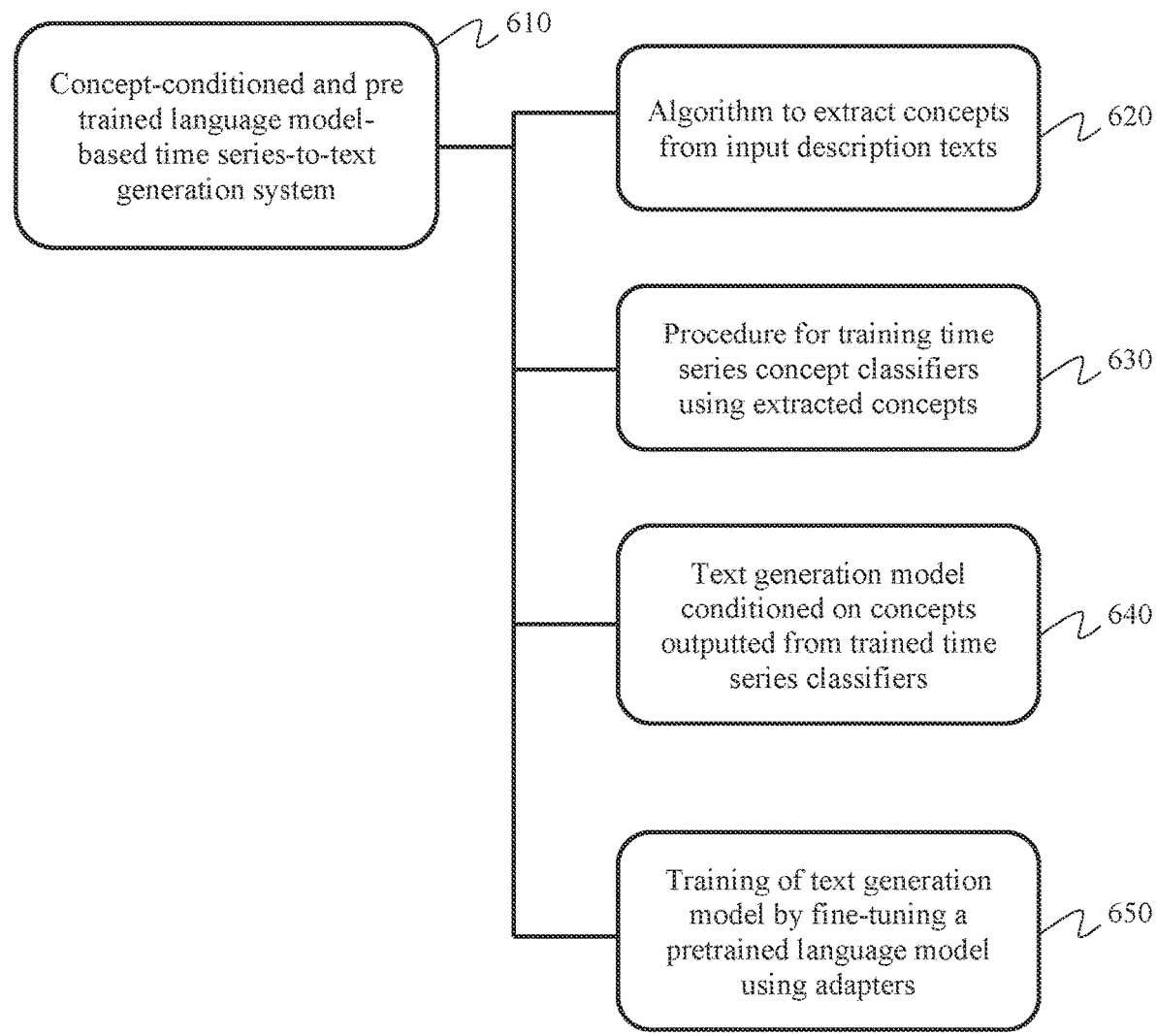
FIG. 6 is a block/flow diagram of an exemplary concept-conditioned and pretrained language model-based time series-to-text generation system, in accordance with embodiments of the present invention.

FIG. 6 is a block/flow diagram of an exemplary concept-conditioned and pretrained language model-based time series-to-text generation system, in accordance with embodiments of the present invention.

At block 610, concept-conditioned and pretrained language model-based time series-to-text generation system is presented.

At block 620, an algorithm is employed to extract concepts from the input description texts.

At block 630, a procedure for training time series concept classifiers is used to extract concepts.

At block 640, the text generation model is conditioned on concepts outputted from trained time series classifiers.

At block 650, training of text generation model is achieved by fine-tuning a pretrained language model using adapters.

In conclusion, a neural network model for automated time series to description text generation is presented. A neural time series encoder is employed to capture important characteristics of the time series that need description. A data-efficient method that uses adapters to finetune a generic pretrained language model for generating description texts given time series in a specific domain is then presented. A constituency parsing-based "concept word" parser is then employed to mine phrases related to key aspects from training texts. The concepts serve as ground truth for training concept classifiers and are aggregated to form a domain concept dictionary.

FIG. 6 is an exemplary processing system for employing a time-series-to-text generation model to generate accurate and fluent description texts, in accordance with embodiments of the present invention.

The processing system includes at least one processor (CPU) 904 operatively coupled to other components via a system bus 902. A GPU 905, a cache 906, a Read Only Memory (ROM) 908, a Random Access Memory (RAM) 910, an input/output (I/O) adapter 920, a network adapter 930, a user interface adapter 940, and a display adapter 950, are operatively coupled to the system bus 902. Additionally, a time-series-to-text model 100 is employed that given a time series window generates accurate and fluent description texts.

A storage device 922 is operatively coupled to system bus 902 by the I/O adapter 920. The storage device 922 can be any of a disk storage device (e.g., a magnetic or optical disk storage device), a solid-state magnetic device, and so forth.

A transceiver 932 is operatively coupled to system bus 902 by network adapter 930.

User input devices 942 are operatively coupled to system bus 902 by user interface adapter 940. The user input devices 942 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 942 can be the same type of user input device or different types of user input devices. The user input devices 942 are used to input and output information to and from the processing system.

A display device 952 is operatively coupled to system bus 902 by display adapter 950.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 7:
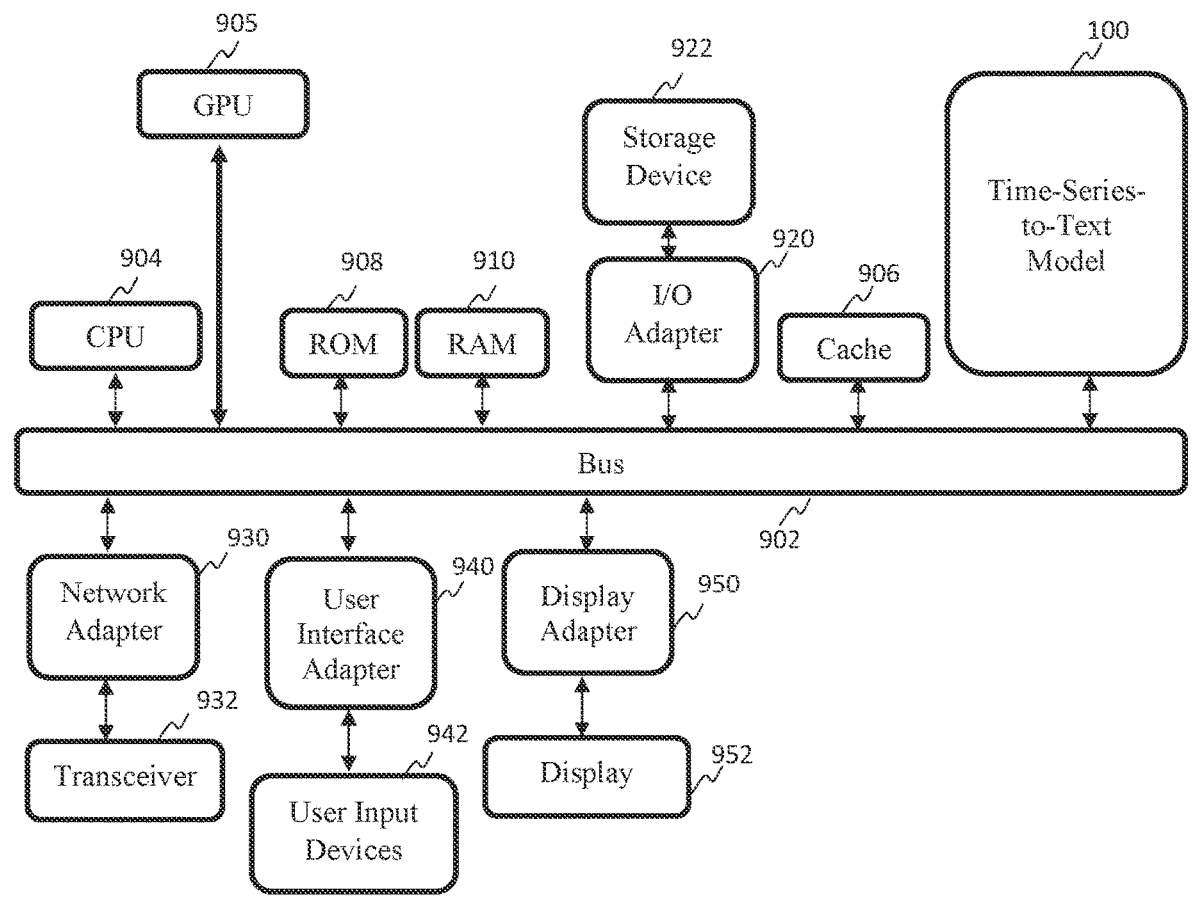
FIG. 7 is a block/flow diagram of an exemplary processing system for employing a time-series-to-text generation model to generate accurate and fluent description texts, in accordance with embodiments of the present invention.
Figure 8:
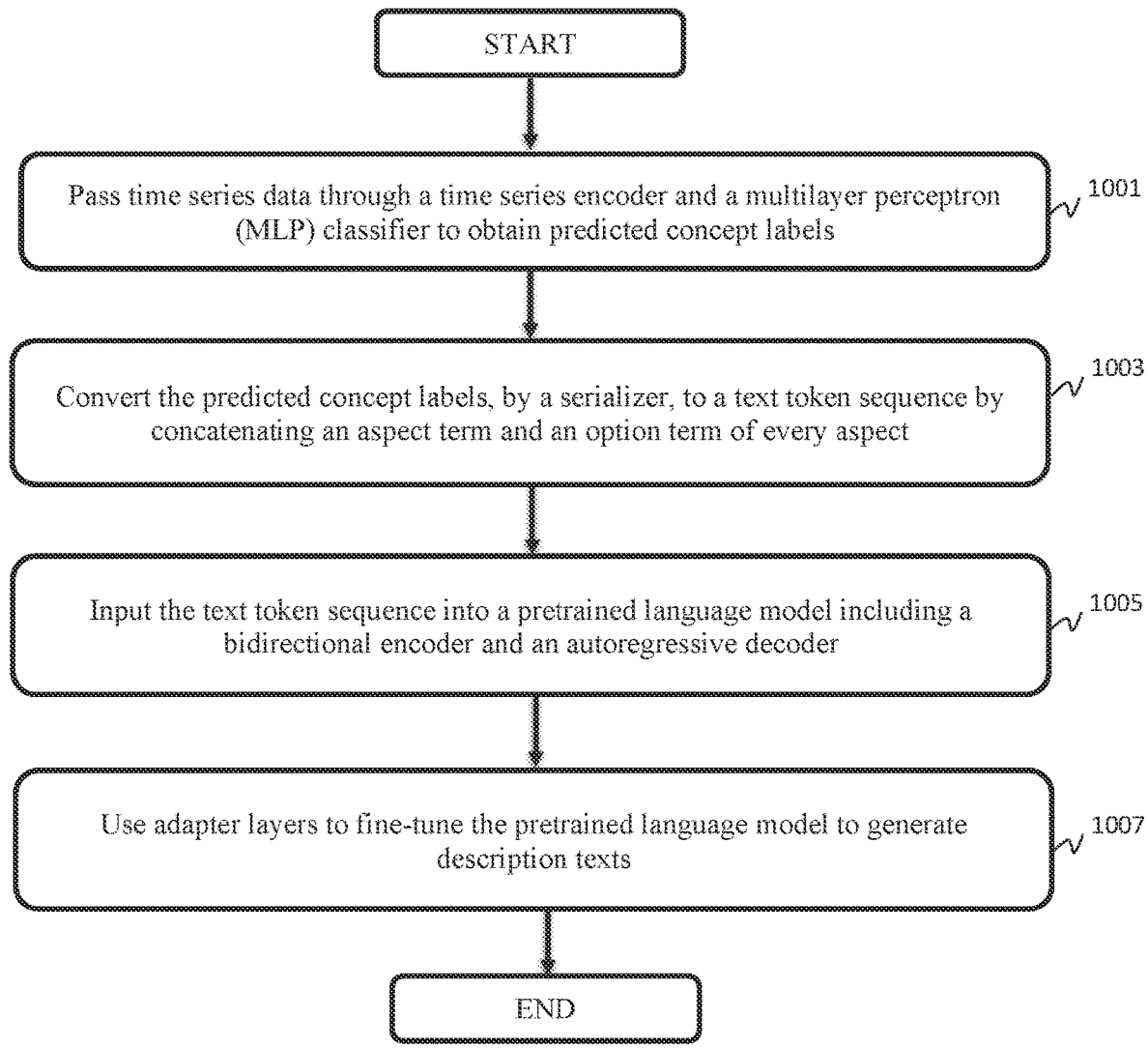
FIG. 8 is a block/flow diagram of an exemplary method for employing a time-series-to-text generation model to generate accurate and fluent description texts, in accordance with embodiments of the present invention.

FIG. 7 is a block/flow diagram of an exemplary method for employing a time-series-to-text generation model to generate accurate and fluent description texts, in accordance with embodiments of the present invention.

At block 1001, pass time series data through a time series encoder and a multilayer perceptron (MLP) classifier to obtain predicted concept labels.

At block 1003, convert the predicted concept labels, by a serializer, to a text token sequence by concatenating an aspect term and an option term of every aspect.

At block 1005, input the text token sequence into a pretrained language model including a bidirectional encoder and an autoregressive decoder.

At block 1007, use adapter layers to fine-tune the pretrained language model to generate description texts.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like. Similarly, where a computing device is described herein to send data to another computing device, the data can be sent directly to the another computing device or can be sent indirectly via one or more intermediary computing devices, such as, for example, one or more servers, relays, routers, network access points, base stations, and/or the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for employing a time-series-to-text generation model to generate accurate description texts, comprising:
    passing time series data through a time series encoder and a multilayer perceptron (MLP) classifier to obtain predicted concept labels;
    converting the predicted concept labels, by a serializer, to a text token sequence by concatenating an aspect term and an option term of every aspect;
    inputting the text token sequence into a pretrained language model (PLM) including a bidirectional encoder and an autoregressive decoder;
    iteratively training the PLM updated with adapter layers by updating parameters of the adapter layers by minimizing a sum of a cross-entropy loss of the predicted concept labels and a text token maximum likelihood estimation (MLE) loss of the text token sequence; and
    using the adapter layers to fine-tune the PLM to generate description texts.

2. The computer-implemented method of claim 1, wherein a concept word parser is used to mine phrases related to the aspects from a training text of the times series data.

3. The computer-implemented method of claim 1, wherein concepts serve as a ground truth for training concept classifiers and are aggregated to form a domain concept dictionary.

4. The computer-implemented method of claim 1, wherein iteratively training the PLM further comprises computing the cross-entropy loss by aggregating the cross-entropy loss between the predicted concept label and a ground truth label for every aspect.

5. The computer-implemented method of claim 1, wherein the MLP classifier takes a last hidden vector of the time series encoder to obtain the predicted concept labels based on a domain concept dictionary.

6. The computer-implemented method of claim 1, wherein iteratively training the PLM further comprises computing the text token MLE loss by aggregating a cross-entropy loss between a probability distribution output of the PLM and a ground-truth token at every position.

7. The computer-implemented method of claim 1, wherein the PLM is fine-tuned with schedule sampling using a combination of teacher-forcing and free-running modes that determines an input at a next position as a true token at a position in a training text for the teacher forcing mode and as a token sampled from a vocabulary based on an output distribution for the free-running mode.

8. A computer program product for employing a time-series-to-text generation model to generate accurate description texts, the computer program product comprising a non-transitory computer readable storage medium having program instructions embodied therewith, the program instructions executable by a computer to cause the computer to perform a method comprising:
    passing time series data through a time series encoder and a multilayer perceptron (MLP) classifier to obtain predicted concept labels;
    converting the predicted concept labels, by a serializer, to a text token sequence by concatenating an aspect term and an option term of every aspect;
    inputting the text token sequence into a pretrained language model (PLM) including a bidirectional encoder and an autoregressive decoder;
    iteratively training the PLM updated with adapter layers by updating parameters of the adapter layers by minimizing a sum of a cross-entropy loss of the predicted concept labels and a text token maximum likelihood estimation (MLE) loss of the text token sequence; and
    using the adapter layers to fine-tune the PLM to generate description texts.

9. The computer program product of claim 8, wherein a concept word parser is used to mine phrases related to the aspects from a training text of the times series data.

10. The computer program product of claim 8, wherein concepts serve as a ground truth for training concept classifiers and are aggregated to form a domain concept dictionary.

11. The computer program product of claim 8, wherein iteratively training the PLM further comprises computing the cross-entropy loss by aggregating the cross-entropy loss between the predicted concept label and a ground truth label for every aspect.

12. The computer program product of claim 8, wherein the MLP classifier takes a last hidden vector of the time series encoder to obtain the predicted concept labels based on a domain concept dictionary.

13. The computer program product of claim 8, wherein the adapter layers are inserted into all transformer layers of the PLM.

14. The computer program product of claim 8, wherein the PLM is fine-tuned with schedule sampling using a combination of teacher-forcing and free-running modes.

15. A computer processing system for employing a time-series-to-text generation model to generate accurate description texts, comprising:
 a memory device for storing program code; and
 a processor device, operatively coupled to the memory device, for running the program code to:
  pass time series data through a time series encoder and a multilayer perceptron (MLP) classifier to obtain predicted concept labels;
  convert the predicted concept labels, by a serializer, to a text token sequence by concatenating an aspect term and an option term of every aspect;
  input the text token sequence into a pretrained language model (PLM) including a bidirectional encoder and an autoregressive decoder;
  iteratively train the PLM updated with adapter layers by updating parameters of the adapter layers by minimizing a sum of a cross-entropy loss of the predicted concept labels and a text token maximum likelihood estimation (MLE) loss of the text token sequence; and
  use the adapter layers to fine-tune the PLM to generate description texts.

16. The computer processing system of claim 15, wherein a concept word parser is used to mine phrases related to the aspects from a training text of the times series data.

17. The computer processing system of claim 15, wherein concepts serve as a ground truth for training concept classifiers and are aggregated to form a domain concept dictionary.

18. The computer processing system of claim 15, wherein iteratively training the PLM further comprises computing the cross-entropy loss by aggregating the cross-entropy loss between the predicted concept label and a ground truth label for every aspect.

19. The computer processing system of claim 15, wherein the MLP classifier takes a last hidden vector of the time series encoder to obtain the predicted concept labels based on a domain concept dictionary.

20. The computer processing system of claim 15, wherein the adapter layers are inserted into all transformer layers of the pretrained language model.

* * * * *